(No Model.) 2 Sheets—Sheet 1.

E. H. GOVE.
ASH SIFTER.

No. 436,351. Patented Sept. 16, 1890.

Witnesses:
Osmon C. Evans
Levi O. Verrill

Inventor.
Edward H. Gove,
Per
Elgin O. Verrill,
Attorney.

(No Model.) 2 Sheets—Sheet 2.

E. H. GOVE.
ASH SIFTER.

No. 436,351. Patented Sept. 16, 1890.

Witnesses:
J. J. Isley.
F. M. Bradley.

Inventor:
Edward H. Gove,
per atty,
Elgin C. Verrill,

UNITED STATES PATENT OFFICE.

EDWARD H. GOVE, OF BIDDEFORD, MAINE.

ASH-SIFTER.

SPECIFICATION forming part of Letters Patent No. 436,851, dated September 16, 1890.

Application filed February 18, 1890. Serial No. 340,867. (No model.)

*To all whom it may concern:*

Be it known that I, EDWARD H. GOVE, of Biddeford, in the county of York and State of Maine, have invented certain new and useful Improvements in Ash-Sifters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in ash-sifters; and it consists of a rotary cylindrical sieve set on a shaft which is journaled in a suitable inclosing-case, said sieve having a longitudinal feed-opening therein and a hood adapted to slide over said feed-opening, said hood being operated by the said shaft in manner as hereinafter more fully set forth.

It also consists in attaching lugs to the ends of the sieve to limit the movement of the said hood, of an improved outside casing combined with an ash-barrel cover, and other details of construction, all substantially as hereinafter more fully described and specifically claimed.

Figure 1:
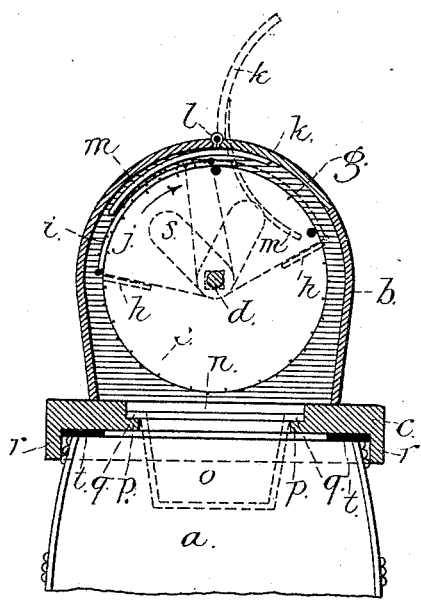
Figure 2:
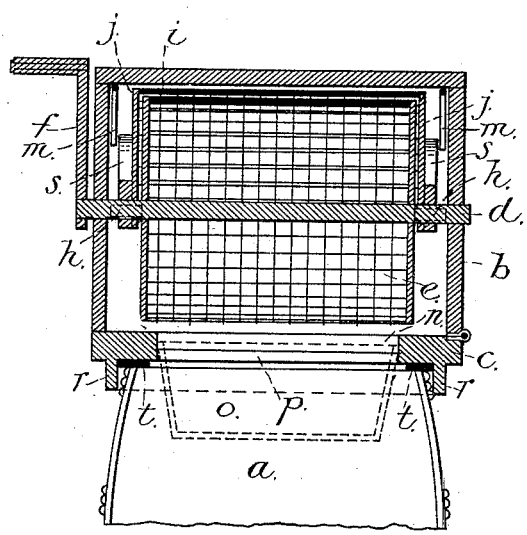
Figure 3:
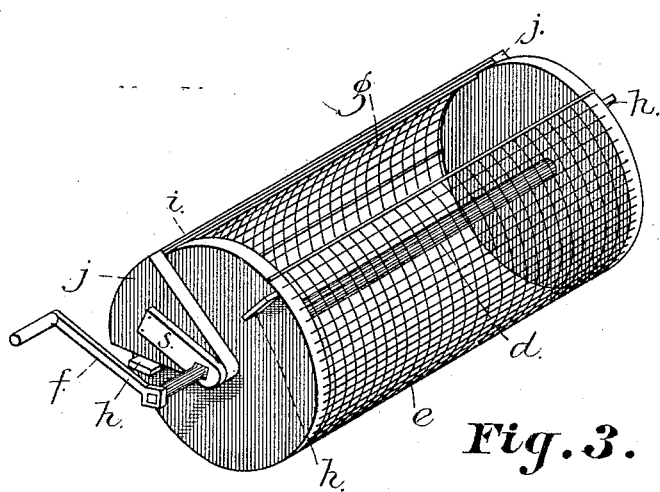

In the drawings herewith accompanying and making a part of this application, Figure 1 is a central cross-section. Fig. 2 is a central longitudinal section. Fig. 3 is an isometric projection showing sieve and hood, and same letters refer to like parts.

In said drawings, *a* represents a barrel, *c* the cover, and *b* the sieve-casing. Journaled in said casing *b* is a shaft *d*, which passes longitudinally through the center of the sieve *e*, the sieve being free to revolve on said shaft, except as hereinafter limited. On one end of said shaft outside of the casing *b* is a crank *f* for imparting a rotary motion to said shaft. The sieve has a feed-opening *g* extending longitudinally from end to end, and on each end two lugs *h*, by which the motion of the hood is limited. Rigidly attached to the shaft outside of the sieve is a hood formed of a top portion *i* and the sides *j*, which extend downward and through which said shaft passes, said top having a circular shape and being sufficiently wide to cover the feed-opening *g* when drawn over it. The sieve-casing has a cover *k*, hinged at *l*, and attached thereto stop-bars *m*, curved, as shown in Fig. 1, which, when said door is open, project down against the lugs *h*. The outer casing *b* is hinged to the barrel-cover *c* at the end opposite that on which is the crank. The cover has a longitudinal slot *n* therein and the projecting parallel ways *p*, adapted to take the flanges *q* of an ash-pan *o*. The cover may also have flanges *r* extending downwardly on the outside of the said barrel, and on the under side a packing of felt or other pliable material, said packing extending around the bottom in such position that the upper edge of the barrel will be embedded therein and thus prevent the escape of dust during the sifting. Said cover would be circular or rectangular, according as the ash-receptacle is circular or rectangular. The sides *j* of the hood are strengthened by the re-enforcing strips *s*.

The operation of my improved sieve is as follows: Suppose the sieve to be in the position shown in Fig. 1, the opening *g* being directly beneath the door *k*, said door *k* being open. The ashes to be sifted are then placed in the sieve through said opening and the door *k* closed. The crank is then turned in the direction indicated by the arrow in Fig. 1. The hood being attached rigidly to the shaft turns with it, while the sieve itself remains stationary until the hood entirely covers the opening in the sieve, at which time the sides of the hood strike against the lugs *h* and thus carry with them the sieve. The rotary motion in this direction is continued until the ashes are thoroughly sifted. Then bring the sieve to the position shown in Fig. 1 and turn the sieve in the direction opposite to that indicated by said arrow. The hood will be turned first until the opening in the sieve is uncovered and the sides of the hood strike against the said lugs. Thus when the sieve is turned so that the opening therein comes on the under side the coals will fall through into the pan beneath.

It is found in practical use that the weight of the ashes and coals in the sieve is sufficient to prevent the sieve itself rotating when the crank is turned except as it is operated upon by the sides of the hood striking against the lugs, as aforesaid. If there were nothing in the sieve, the friction of the sieve resting on the shaft might be sufficient to cause the sieve to revolve independently of the hood and render the opening of the feed-opening in the sieve to insert the ashes impossible. To obviate this possible difficulty I have the cover *k* provided with a lever, as *m*, on the under side thereof, and having substantially the same curvature as the sieve, which, when said cover is open, as shown by dotted lines in Fig. 1, will extend downwardly and strike against the lugs *h* when the sieve is being revolved in the direction opposite to that indicated by the arrow, thus stopping the sieve and allowing the hood to pass on till the feed-opening is uncovered.

Having thus described my invention and its use, what I claim, and desire to secure by Letters Patent of the United States, is—

1. The combination, with a suitable casing, of a rotary sieve having a longitudinal opening therein, a shaft passing centrally through the sieve-heads and free to turn independently of the sieve, said shaft being journaled in the casing, and a hood having sides extending down at the ends of the sieve and rigidly attached to the said shaft and adapted to be drawn over said opening by means of said shaft, substantially as and for the purposes set forth.

2. The combination, with a rotary sieve loosely mounted on a shaft passing centrally through the heads thereof and journaled in suitable bearings, said sieve having a longitudinal opening in the barrel and lugs on the outsides of the heads, of a hood having sides extending downwardly at the ends of the sieve and rigidly attached to the said shaft and adapted to be drawn over said opening by means of said shaft, substantially as and for the purposes set forth.

3. The combination, with a rotary sieve set on a shaft journaled in a suitable case, said sieve having lugs projecting outwardly from the heads, of a door hinged to said case and carrying stop-levers adapted to engage the lugs on the heads of the sieve only when the said door is open, substantially as and for the purposes set forth.

In testimony that I claim the foregoing as my own I affix my signature in presence of two witnesses.

EDWARD H. GOVE.

Witnesses:
L. PITT ANDREWS,
ROSCOE C. MOODY.